United States Patent [19]
Szpak

[11] 3,771,796
[45] Nov. 13, 1973

[54] RECORD CHANGER SPINDLE

[75] Inventor: Anthony D. Szpak, Parma, Ohio
[73] Assignee: Avnet, Inc., New York, N.Y.

[22] Filed: Aug. 16, 1971
[21] Appl. No.: 171,863

[52] U.S. Cl. .............................................. 274/10 S
[51] Int. Cl. .............................................. G11b 17/04
[58] Field of Search .................................. 274/10 S

[56] References Cited
UNITED STATES PATENTS

| | | | |
|---|---|---|---|
| 2,629,604 | 2/1953 | Pifer | 274/10 S |
| 2,946,595 | 7/1960 | Costa | 274/10 S |
| 3,506,273 | 4/1970 | Thevenaz | 274/10 S |

*Primary Examiner*—Louis R. Prince
*Assistant Examiner*—Steven L. Stephan
*Attorney*—John A. Dienner et al.

[57] ABSTRACT
The subject invention provides means for automatic lowering onto a turntable, phonograph records, one at a time, from a stack of records which may contain records having a large variation in hole geometry including records of a thickness at the hole of less than the standard thickness heretofore in general use. The present invention will feed records of less than standard thickness with records of standard thickness. Thick and thin records are successfully dispensed indiscriminately by my invention. The invention will also operate satisfactorily where the configuration of the hole has been damaged as by wear.

10 Claims, 29 Drawing Figures

Inventor:-
Anthony D. Szpak
By Johnson Dienner Emrich
Verbeck & Wagner. Attys.

RECORD CHANGER SPINDLE

BACKGROUND

Phonograph records for many years have been manufactured by various manufacturers to a standard of thickness at the label portion of the record within the limits of from about 0.053 inch to about 0.09 inch. The manufacturers of automatic record changers have designed record changers adapted to operate with records falling within the above stated limits.

Recently much thinner records have come on the market and are going into extensive use.

It is found that record changers that in general have satisfactorily dispensed thick records encounter difficulties in operation in feeding the thin records alone, or interspersed with the thick records.

Record changers now in use, designed for the thick records, will at times drop two thin records or a thin record and a thick record above it. Also there may be instances where in a single feeding cycle a single record will be dropped at the proper time and a second record also dropped within the same cycle. So far as I am aware, no mechanism capable of insuring the delivery of only one record at a time from a mixed stack of records of substantially different thicknesses is available to the public. Variations in the geometry of the hole complicates the situation.

SUMMARY OF THE INVENTION

The present invention provides a record changer feeding mechanism having the ability to separate records having a large variation in hole geometry. The spindle of my invention will reliably feed one at a time records of prior standard thickness, herein referred to as thick records, or the aforesaid thin records. It will operate correctly even when a stack contains records of different thicknesses intermixed or when the stack consists of records of only one thickness — either thick or thin. It will operate successfully on records exhibiting different degress of wear at the hole.

The invention in its preferred form utilizes a spindle for supporting a stack of records and for guiding the records fed from the stack down axially onto a turntable for playing. It utilizes as a gate mechanism or separator a deformable mass of soft resilient rubber-like material such as silicone rubber, preferably in the shape of a wheel mounted on an axle. A mechanical pusher operated in proper time in the operating cycle, by well known means such as a cam, pushes the lowermost record off of a retaining shoulder or shelf which supports the stack of records to be played.

The soft rubber wheel, in performing its function as a gate, serves in several capacities. First, it is designed to engage and press against the inside surface of the hole in the record where it presents a resistance to movement of the record in the direction of release from the restraining shoulder or shelf. In the preferred form of the invention where the pusher and gate member operate on the record by pressures exerted upon the walls of the hole in the record, the pusher operates on one side of the axis of the hole and the gate member operates on the walls of the hole in the record next above the lowermost record in the stack in a direction away from the shoulder.

The soft rubber wheel is designed to engage the inside surface of the hole in a record on that side of the hole which is opposite the shoulder on the spindle, and thereby it serves to keep the record, while it is in the stack and approaching the shoulder, in such position on its downward travel towards the shoulder that it will arrive with the margin of the hole in the record in register with the shoulder. This serves to insure that the records, as they are placed on the record holding part of the spindle, will be directed so that they are stopped and held on the spindle shoulder for automatic feeding.

The second major function which the wheel performs is in the operation of pushing a record off of the shoulder. The pusher presses against the forward edge of the hold in the lowermost record. The periphery of the wheel below the axis of the wheel is deformed into the hole in the record. As the record is pushed toward the edge of the shoulder the body of the wheel inside the hole is forced or displaced upwardly between the axle and the back edge of the hole in the next above record and increases the backward pressure against the back edge of the hole in the next to the lowermost record, thereby tending to restrain movement of said next to the last record in the direction of the shoulder. This provides a form of gate action in restraining the next to the bottom record from moving towards the edge of the shoulder, not only as they are first placed on the spindle but also as the stack is lowered upon the release of the lowermost record as it is pushed off of the shoulder by the pusher.

The third function which this rubber wheel or gate performs in one embodiment of the invention is in conjunction with the backward movement of the pusher lever after the discharge of a record from the shoulder. In said backward movement the upper end of the pusher lever engages the wheel and deforms it and presses it against the wall of the hole in the bottom record and in the next to the bottom record to hold them more firmly on the shoulder. In other words the backward stroke of the pusher tends to restrain movement of the lowermost record so that it does not slide off of the shoulder.

The fourth function which this rubber wheel performs is in the operation of pushing a record off the spindle shoulder. As the lower record is displaced by the pusher to a point where it is ready to drop down the spindle body, the rubber wheel provides a downward thrusting force component which assists in the parting of the bottom record from the rubber wheel. This trusting force combined with the rolling action of the rubber wheel insures disengagement of the record from the rubber wheel. The weight of the bottom record and the record stack assist by causing the rubber wheel to rotate when the bottom record and stack lowers.

The fifth function which this rubber wheel performs is in the operation of removing a record from the turntable. As a record is removed it must pass over the rubber wheel. The wheel, due to its high degree of compliance and ability to freely rotate, complies with the passage of a record over it by exhibiting a minimum drag force or resisting force to the record. It simply rolls through the record as it passes over the roll.

The present record feeder preferably operates in conjunction with a suitable record stabilizer of known type such as an over-arm support or a record edge support, as is explained in detail hereafter.

OBJECT OF THE INVENTION

The primary object of the invention is to provide a record feeder for a record changing device, which feeder will perform reliably on records having substantial variations in hole geometry of the records involved.

A further object of the invention is to provide an automatic record feeder which will reliably feed records one at a time from a mixed stack of thick and thin records or from a stack of thin records.

DESCRIPTION OF THE DRAWINGS

The accompanying drawings illustrate the present invention in several modifications with a showing of four stages of operation for each embodiment. Each of the modifications applies to record stacks having varied as well as uniform record thicknesses and hole sizes.

GENERAL EXPLANATION OF THE SHOWING OF THE DRAWINGS

The drawings illustrate the record changing spindle of the present invention as operating on a stack of three records. The number of records in the stack is not limited to any number within the capacity of the record changer spindle.

Also, while a stack of records of different thicknesses is shown in the stacks in the embodiments of FIGS. 1 to 4, FIGS. 5 to 8, FIGS. 9 to 12 and FIGS. 17 to 20, respectively, and a stack of records each of which is substantially the same thickness is shown in the embodiment of FIGS. 13 to 16, it is to be understood that the record changing spindle of the present invention is capable of feeding reliably, one at a time, records of the same or different thickness, in any order.

Also, while the drawings show the records in the various embodiments illustrated in the figures to have central holes of the same uniform diameter with square edges, it is to be understood that the record changer spindle of the present invention handles successfully, one at a time, records of different thicknesses and having variations of geometry of the central hole within a fairly wide range, such as occurs due to wear.

DESCRIPTION OF THE PREFERRED EMBODIMENT OF THE INVENTION AND MODIFIED FORMS OF THE SAME

Figure 24:
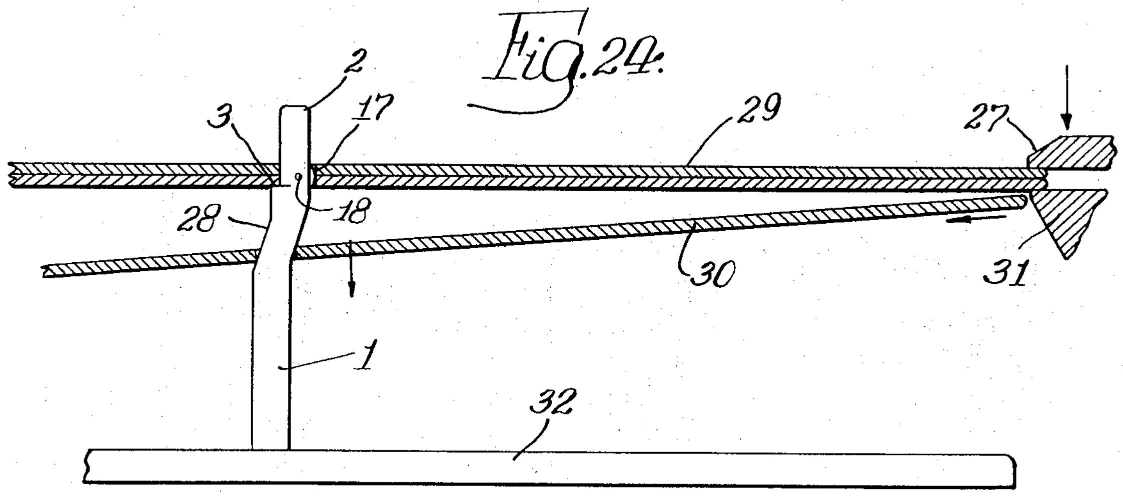
FIG. 24 is a vertical section through one form of my record feeding mechanism employing an edge type record stabilizer.
Figure 25:
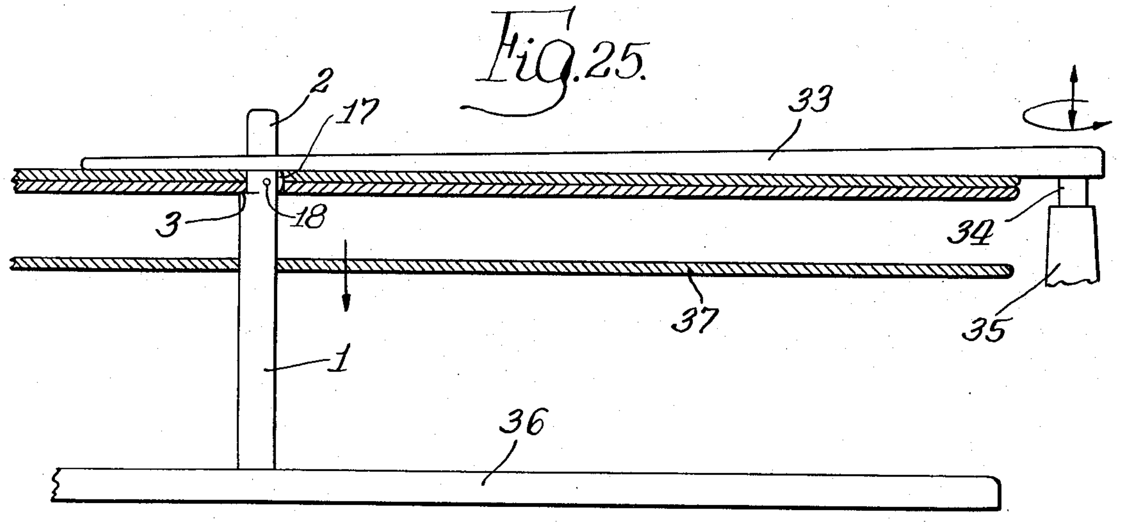
FIG. 25 is a similar vertical section through another form of my record feeder employing an overarm type stabilizer.

There are two general forms of record changers to which the present invention is readily applicable. FIG. 24 shows the edge type of record stabilizer and FIG. 25 shows the overarm type of stabilizer. The automatic releasing mechanism for dropping the records one at a time, which involves the chief features of the invention, is illustrated in connection with FIGS. 1 to 23 in certain specific embodiments.

Referring now to the embodiments shown in FIGS. 1, 2, 3, 4 and FIGS. 1*a*, 2*a*, 3*a* and 4*a*, spindle 1 of a record player is provided with the usual turntable, tone arm, and cycling mechanism for swinging away the tone arm to permit the release and lowering of a record from the stack held on the shoulder or shelf of the spindle. Thereupon the playing of the record, which has just been lowered, is caused to proceed. The automatic cycling mechanism for feeding records one at a time and playing them is well known to those skilled in the art.

Refer now to FIGS. 1 to 4 and FIGS. 1*a* to 4*a*.

The spindle 1 is a vertical post supported in the frame of the player at its lower end. The spindle consists of two main portions—namely, the record storage portion 2 at the upper end, and the guiding portion 4 with a shoulder or shelf 3 formed at the junction of the storage portion 2 with the guiding portion 4 for normally supporting the weight of the records in the stack 5. A pusher lever 6 extends from a point slightly above the shoulder 3 to a point below the mounting of the lower end 7 of the spindle. The lever 6 is a first-class lever mounted on a pin 8 fixed in the body of the spindle. The pusher lever 6 has a short slot 9 embracing the pin 8 thereby permitting the lever to swing about the pin 8 and to move longitudinally in the line of the slot. The lower end of the lever extends out of the longitudinal slot 10 in the spindle to a point below the same. This lower end 11 is engaged by a spring 12 tending to raise the lever and to hold the pin and slot in the position shown in FIG. 1.

Figures 1, 1A, 2, 2A, 3, 3A, 4, 4A:
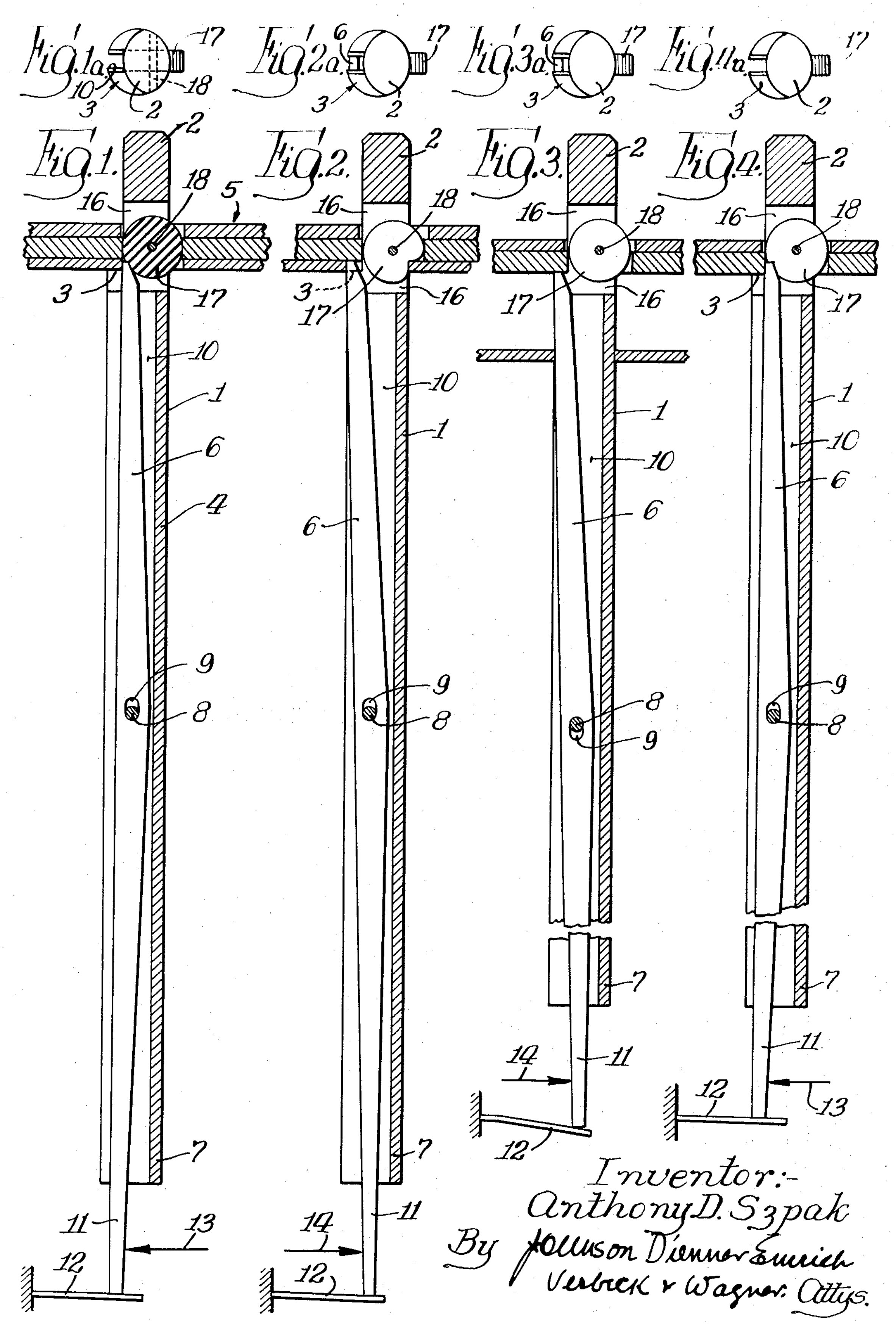
FIG. 1 illustrates diagrammatically a preferred embodiment of my invention, the stack of records being illustrated by three records of different thicknesses shown in section, the downward movement of the stack being stopped by the spindle shoulder.
FIG. 2 shows the movement of the pusher shoving the lowermost record off of the shoulder.
FIG. 3 shows the stack dropping onto the end of the pusher and causing it to lower against spring pressure while the released record travels down the spindle towards the turntable.
FIG. 4 shows the parts in the same general position as FIG. 1 with, however, the lowermost record of FIG. 1 being released and the remaining records of the stack having descended against the end of the pusher and lodged upon the shoulder.
FIGS. 1*a*, 2*a*, 3*a* and 4*a* are top plan views of the spindle, pusher and roller as they appear in the successive stages of operation represented in FIGS. 1 to 4 respectively.

The operation of the cycling mechanism which actuates the pusher lever 6 is indicated by the arrow 13 in FIGS. 1 and 4 acting to swing the lever 6 in a clockwise direction and by the arrow 14 as acting to swing the lever in the counterclockwise direction.

The upper end of the spindle structure which forms the record holding portion 2 is an extension of the main cyclindrical body forming the spindle 1 with a portion cut away to provide a portion of reduced fore and aft thickness terminating in a crescent-shaped shoulder or shelf 3. As will be seen from FIGS. 1*a*, 2*a*, 3*a* and 4*a*, a slot 10 extends for the full length of the guiding portion of the spindle and it contains the pusher lever 6 which extends up above the shoulder 3 as is apparent from FIGS. 1 and 4 and the plan views of FIGS. 1*a*, 2*a*, 3*a* and 4*a*, corresponding to the elevations of FIGS. 1 to 4.

The shoulder or shelf 3 seen in plan view in FIG. 1*a* is interrupted by the slot 10 to permit the tip of the pusher lever 6 to swing outwardly to the left as seen in FIG. 1 so that it can thereby push the lowermost record off of the shoulder 3. The pusher lever 6 can be swung clockwise far enough to retreat into the transverse slot 16 which extends horizontally through the record holding portion 2 of the spindle.

Assuming that the operator loads a record or stack of records onto the spindle shown in FIGS. 1 and 1*a*, the operator will register the hole in the record or stack of records with the record holding portion 2 of the spindle 1 and allow the records to lower. The rear margin of the hole in the record will encounter the outwardly projecting portion of the wheel 17 which projects beyond the cylindrical surface of the spindle in a direction away from the shelf or shoulder 3. The projection of the roller 17 from the rear of the cylindrical body of the spindle is slightly greater than the width of the shoulder 3 whereby to insure that as a record slides down the holding portion 2 of the spindle it will encounter the periphery of the wheel 17 and be urged in a direction to bring the margin of the hole in the record onto the shoulder 3.

Figures 21, 22:
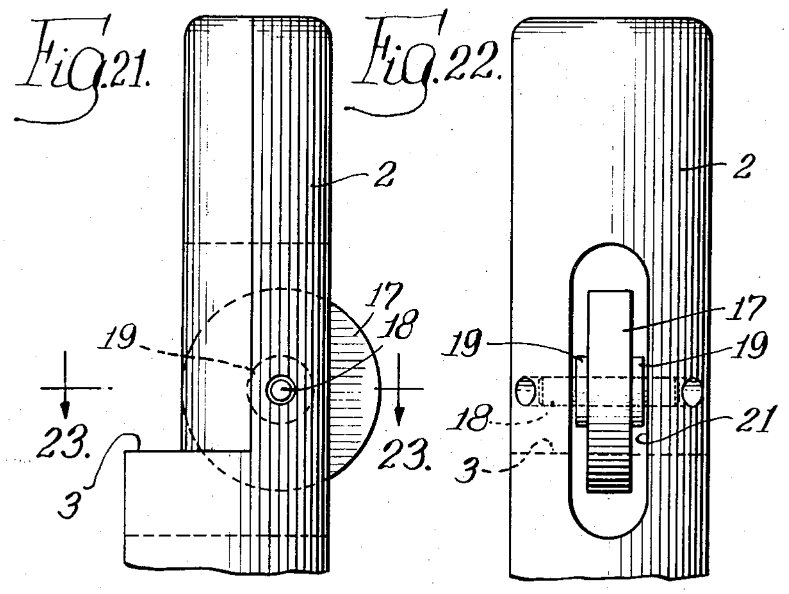
FIG. 21 is a side elevation on an enlarged scale showing the mounting of the resilient wheel in the upper end of the spindle.
FIG. 22 is a front elevational view of the upper end of the spindle taken from the right side of FIG. 21.
Figure 23:
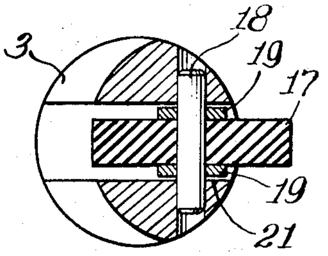
FIG. 23 is a horizontal cross section through the axis of the rubber wheel on the line 23—23 of FIG. 21.

Attention is called to the enlarged views of FIGS. 21, 22 and 23 showing the wheel 17 mounted on a transverse pin 18 which forms an axle for the wheel. Spacing washers 19—19 keep the sides of the wheel 17 from rubbing against the flat sidewalls 21 of the recess in which the wheel 17 is disposed.

The wheel 17 is made of a tough soft yielding rubber-like compound such as silicone rubber. It is readily deformed by the engagement of the pusher lever as will be described below, and also by the engagement of the margins of the holes in the record in performing its service as a gate hindering the movement of records above the lowermost record when the pusher lever is actuated to swing in the counterclockwise direction shown in FIGS. 1 to 4 for the purpose of shoving the lowermost record off of the shoulder 3 while the records above the lowermost record are restrained.

It will be observed that in FIGS. 1 to 4 the three records shown are all of different thicknesses. With the parts in the normal position of rest shown in FIG. 1 the stack of three records is supported on the shoulder 3. The upper end of the pusher lever 6 bears lightly against the adjacent periphery of the wheel 17 and extends above the shoulder a distance less than the thinnest record encountered in the collection of records available.

It will be understood that the pusher lever 6 is pivoted on a pin 8 through an elongated opening or slot 9 and that in the stage of operation shown in FIG. 1 the spring 12 holds the lever endwise in its uppermost position so that the upper end extends above the shoulder a distance not greater than the thinnest record to be encountered in the operation of playing.

The cycling mechanism holds the lever 6 in the position shown in FIG. 1—that is, with the upper end lying radially inside the radial dimensions of the shoulder 3. When the cycling mechanism is put into operation for the purpose of dropping the lowermost record of the stack onto the turntable, the lever 6 is swung in a counterclockwise direction by mechanism 14. At this time the pusher is still in its uppermost position. The pushing of the lowermost record to the left as shown in FIG. 2 moves the hole in the record into register with the guiding portion of the spindle 1 as shown in FIG. 2. This movement presses the wall of the hole in the record against the periphery of the rubber wheel 17 deforming the wheel as shown in FIG. 2. It thrusts a part of the mass of the wheel upwardly between the mounting axle pin 18 and the inner wall of the hole in the second record shown in FIG. 2. Thereby it operates as a gate allowing the movement of the lowermost record to the left, but restraining the movement of the next to the lowest record by pressure of the rubber wheel exerted against the side of the hole away from the shelf or shoulder 3.

The record which has been displaced from the shoulder then drops down the length of the guiding part of the spindle onto the turntable.

The removal of the lowermost record from the shoulder allows the weight of the stack remaining to press down endwise on the top of the pusher as shown in FIG. 3.

As the lowermost record drops as shown in FIG. 3 the weight of the stack above the shoulder bears down on the upper end of the pusher lever 6. The spring 12 in the cycling mechanism receives the downward thrust on the pusher lever 6 to bring its upper end to the level of the shoulder 3.

The downward motion of the record stack causes the rubber wheel to rotate in a clockwise direction. This rotation insures disengagement of the lower record from the rubber wheel. The rotation of the rubber wheel also extends the life of the wheel since its entire periphery acts as a wear surface. When the last record is being dropped it causes the rotation of the rubber wheel to insure disengagement.

The next stage of the cycling mechanism swings the pusher lever in a clockwise direction as shown in FIG. 4 thereby resting the weight of the stack upon the shelf or shoulder and allowing the pusher lever to move vertically to the limit of the slot 9 in a clockwise direction a distance sufficient to bring the upper end of the pusher lever 6 within the confines of the holding portion 2 of the spindle as shown in FIG. 4.

This puts the parts back in the position which they occupied in the stage of FIG. 1 except that the lowermost record of FIG. 1 has been dropped and the next record now rests upon the shoulder 3 ready for a repetition of the cycle just described. It is to be observed that in FIGS. 1 to 4 the three records illustrated are of different thicknesses, and the hole diameters vary. The resilient mass of soft rubber provided by the wheel 17 insures first that in loading a record or records into the shoulder or shelf 3 the first record, in descending to the shoulder, is pushed to the right as viewed in FIGS. 1 to 4 to insure that the lowermost record arrives in register with the shoulder to be supported by the same. The next lowermost record will also be urged toward the right in FIG. 1.

Figures 5, 6, 7, 8, 13, 14, 15, 16:
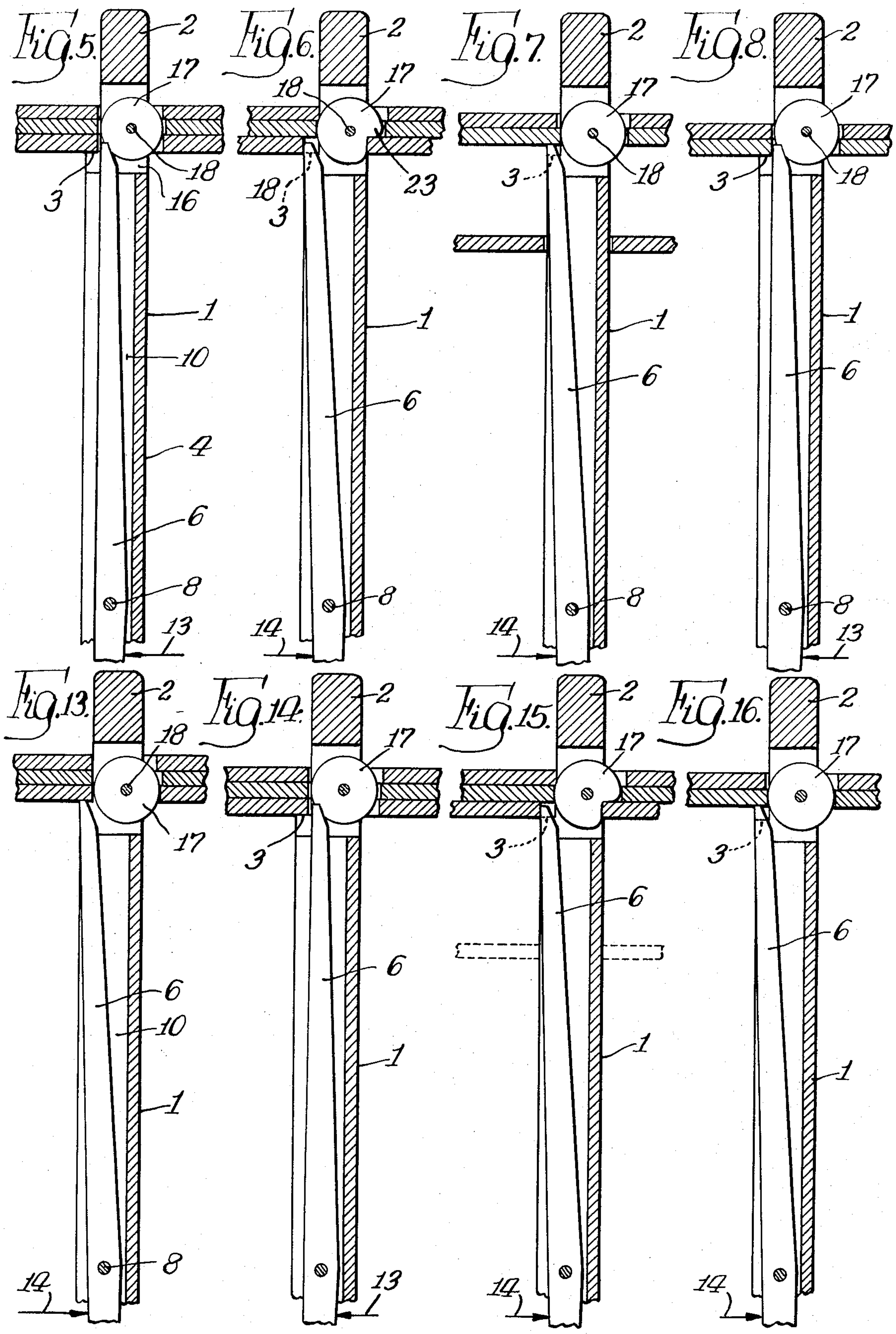
FIGS. 5, 6, 7 and 8 are diagrams illustrating the successive position of parts in a concpet variation utilizing a simple pivoted rather than upward sprung lever; the records drop to the spindle shoulder as the lever is retracted.
FIGS. 13, 14, 15 and 16 illustrate diagrammatically the structure and operation of another modification where the successive position of parts are shown in the operation of releasing the lowermost record and retaining the stack on the upper end of the lever after completion of the drop cycle.

In the embodiment of FIGS. 5 to 8 inclusive, the pusher lever 6 is pivoted on a stationary axis for clockwise and counterclockwise motion about the pin 8. The upper end of the pusher lever 6 extends above the shoulder 3 a distance not greater than the thinnest record to be encountered in the dispensing operation. The upper end of the pusher lever stands within the confines of the holding portion 2 of the spindle. No substantial distortion of the resilient wheel 17 occurs in that position of the parts. When the cycling mechanism reaches the stage of producing the dropping of a record from the stack, the pusher lever 6 is swung in a counterclockwise direction as illustrated in FIG. 6. The upper end of the pusher lever 6 extends above the shoulder a distance no greater than the thickness of the thinnest record to be fed from the bottom of the stack. When the lowest record has been shoved off of the shoulder 3, as indicated in FIG. 6, the record drops down along the length of the spindle 1 as shown in FIG. 7, and the stack of records which has lost the support of the shoulder 3 now rests on the upper end of the pusher lever 6. In the succeeding action of the cycling mechanism the pusher lever is swung in a clockwise direction restoring the parts to the same position that was shown in FIG. 5 except that there is one less record in the stack.

The gate action of the rubber wheel of the foregoing embodiment is illustrated particularly in FIG. 6 where the movement of the lowermost record in coming into register with the guiding portion of the spindle at the shoulder produces a displacement of the body of the wheel 17, as indicated at 23, to block horizontal movement toward the shoulder.

In the embodiment of FIGS. 13 and 16 inclusive, the records on the holding portion of the spindle 2 are supported on the end of the pusher lever 6 and the records are prevented from release by the engagement of the wheel 17 with the back wall of the hole in the lowermost record or the two lower records. The first step in the operation of the cycling mechanism moves the lever 6 in a clockwise direction to drop the records to the shoulder 3, the upper end of the pusher lever displacing some of the substance of the lower part of the wheel 17.

Dropping of the record as shown in FIG. 15 appears in the second step of operations when the movement of the pusher lever 6 to the left in FIG. 15 moves the lowermost record to register with the lower part of the spindle and the back wall of the hole in the lowermost spindle displaces some of the material of the wheel 17 to act as a gate on the next to the lowermost record as shown in FIG. 15. When the lowermost record drops, as shown in FIG. 15, the wheel resumes its normal undistorted position still holding the lowermost record on the shoulder 3 as in the initial position of FIG. 13 except that the stack has been diminished by the dropping of the lowermost record as above described.

Figures 9, 10, 11, 12:
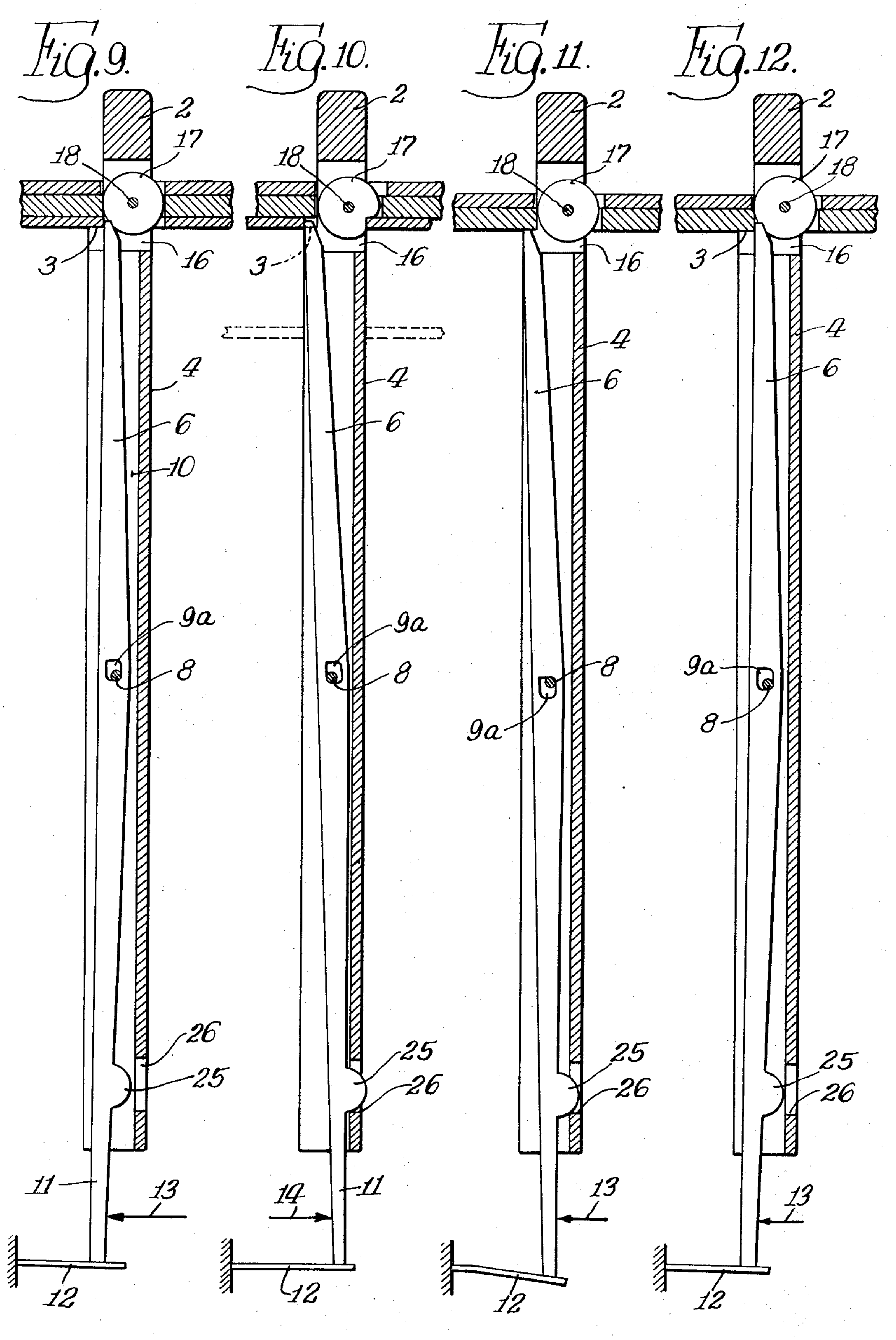
FIGS. 9, 10, 11 and 12 illustrate diagrammatically a modification in which the pusher lever and the spindle are pinned together for two-dimensional freedom of motion provided by the rectangular slot in the lever. Provision of a cam surface at the lower end of the pusher allows for slow lowering of the record stack to the spindle shoulder.

FIGS. 9, 10, 11 and 12 illustrate a modification in which the lever is given vertical support in the spindle when the weight of the stack is transferred from the shoulder 3 to the upper end of the pusher lever. In this construction the pusher lever 6, between record dropping operations, is supported on a spring 12 at its lower end. The pusher lever has a rectangular or two-dimensional slot 9a embracing the pin 8 whereby lateral and longitudinal movement in limited degree of the lever with respect to the pin is provided for. The lever is normally held between record dropping operations with the upper end thereof inside the line of the stack supporting extension 2 as shown in FIG. 9. The resilient rubber-like wheel 17 projects out through the slot 16 to the rear of the holding portion 2.

The wheel thereby provides its desired function of directing the lowermost record onto the shoulder when the spindle is first loaded. The lower end of the pusher is provided with a projection 25 which may enter the slot 26 to give the pusher lever vertical support endwise when the lowermost record is released and the weight of the stack descends upon the end of the pusher lever 6. The rectangular slot 9*a* in the pusher lever embraces the fixed pin 8 in the spindle body and allows for a certain amount of lost motion in both horizontal and vertical directions. In the normal position of the spindle and stack, the pusher lever is supported in its upper position by the spring 12 holding the lower end of the slot 9*a* against the pin 8 and holding the upper end of the pusher lever within the confines of the record holding portion 2 to leave the shoulder 3 unobstructed. The rubber-like wheel 17, which is journaled on the pin 18 serves as a guide for the descending records in charging them upon the holding portion 2 above the shoulder 3.

No downward pressure on the lever 6 occurs in this position. The upward pressure of the spring 12 holds the bottom of the slot 9*a* against the pin 8.

As shown in FIG. 10 when the cycling mechanism, moving as indicated by the arrow 14, swings the pusher lever in a counterclockwise direction, it slides the lowermost record, which in this case is shown as a thin record, off of the shoulder 3 with the result that the lowermost record slides down along the guiding portion of the pusher and the weight of the superposed records falls upon the top of the lever 6 as indicated in FIG. 10.

At this stage the projection 25 on the lower end of the lever 6 engages the spindle at the lower end of the slot 26.

It will be observed that the stack of records shown in FIGS. 9, 10, 11 and 12 comprises a lowermost record of relatively small thickness as compared with the next to the lowest record which is a thick record. While the removal of a thin record from under the stack allows the stack to fall only a short distance, if the lowermost record were a thick record the distance which the stack could drop would be equal to the thickness of the thick record and might give a substantial jolt to the pivot pin. The inter-engaging projection 25 and shoulder 26 on the pusher and spindle, respectively, provides substantial support to the impact of the stack of records falling through the distance of the thickness of a thick record.

In the next stage of operations, shown in FIG. 11, the pusher lever 6 is depressed against the resistance of the spring 12 causing the record stack to be gently lowered to the spindle shelf 3. Then to complete the cycle of operations the lever 6 is swung fully clockwise disengaging the projection 25 and the bottom of the slot 26.

This is shown in FIG. 11. Then as shown in FIG. 12, the pusher lever is raised by the spring 12 and is swung in a clockwise direction to bring the upper end of the pusher lever within the confines of the record holding extension 2 of the spindle.

The rectangular opening 9a in the pusher lever which embraces the fixed pin 8 provides lateral and longitudinal freedom of motion to accompany the desired effect of supporting the lever on the interengaging projection 25 and recess 26 for dropping a stack upon the end of the lever.

In the embodiment of FIGS. 17 to 20 the interengaging projection 25 and shoulder 26 are employed to sustain the weight of the stack in the initial position of a change cycle. This interengagement of the lever and spindle to receive downward pressure are also useful for the dropping of a number of records onto the holding portion of the spindle in loading the same for playing a series of records. The operation of this modification is apparent from FIGS. 17 to 20 of the drawings. The records are normally supported on the upper end of the lever 6 with the projection 25 and shoulder 26 interengaged for a supporting effect.

Figures 17, 18, 19, 20:
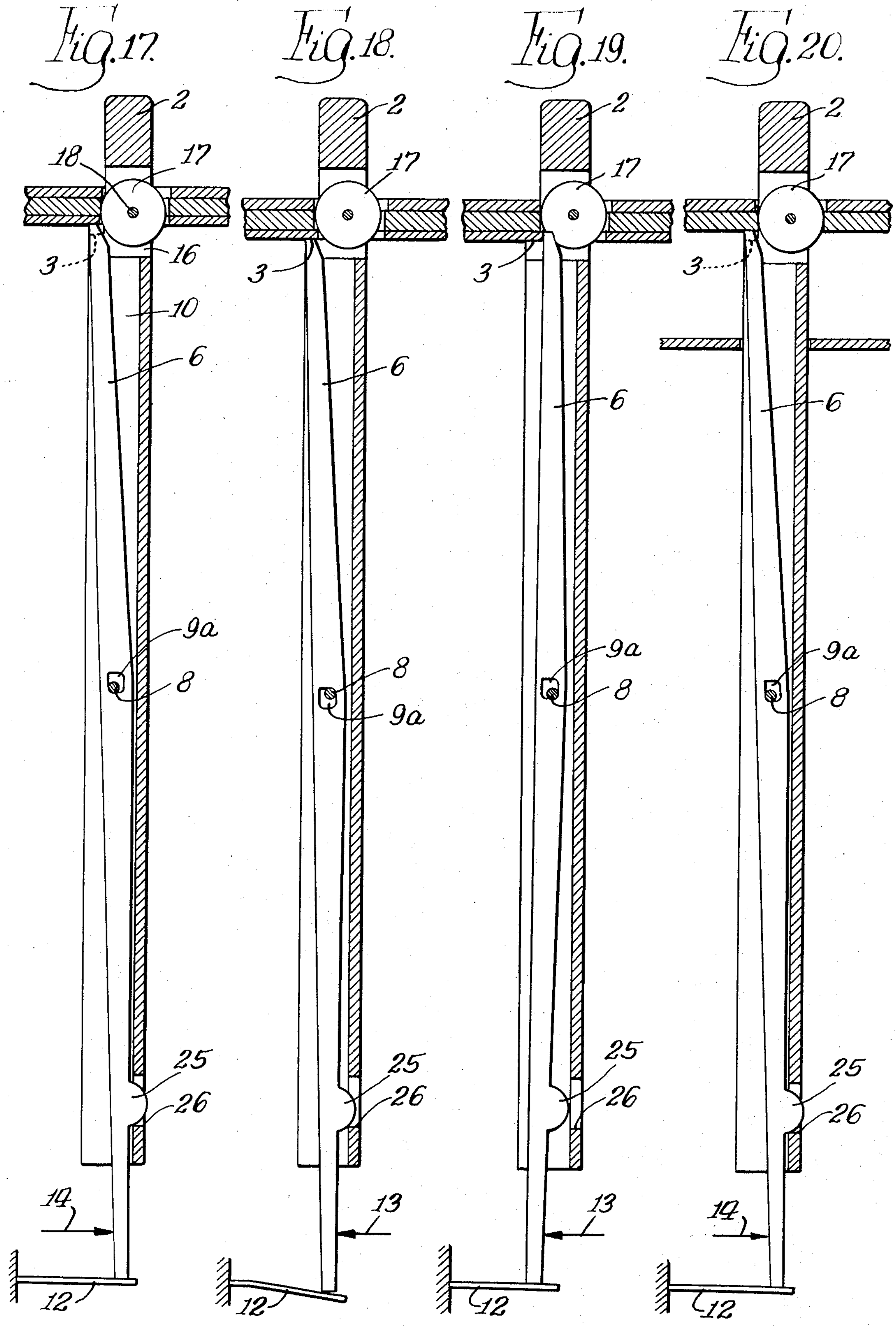
FIGS. 17, 18, 19 and 20 are diagrams that illustrate a further modification of my invention. The successive position of parts are shown in the operation of first, slowly lowering the record stack to the spindle shoulder, followed by release of the lowermost record.

The second stage is illustrated in FIG. 18 by the lowering of the lever 6 and disengagement of the projection 25 and shoulder 26. In the next stage as shown in FIG. 19, the lowermost record resting on the shoulder, the upper end of the lever is withdrawn toward the rubber wheel 17 and raised so that the upper end of the lever 6 extends above the shoulder sufficiently to obtain a hold on the lowermost record which is here shown as a thin record. The wheel 17 has its directing function for records threaded onto the extension 2 to cause them to move into register with the shoulder 3. In completing the cycle, as shown in FIG. 20, the parts are restored to the position they occupied in FIG. 17 except that the lowermost record has been dropped onto the turntable.

The foregoing forms of the present invention are adapted to be employed in conjunction with a record stabilizer such as an over arm support or a record edge support as exemplified in FIGS. 25 and 24 hereof.

FIG. 24 shows a vertical cross section through a spindle and edge-type stabilizer.

The stack 29 of records is supported on the shoulder 3 with the resilient gate wheel 17 extending from the back of the spindle as in the embodiments of FIGS. 1 to 23.

The pusher lever in the spindle (not shown) is actuated at a suitable point in the cycle of operations to push the lowermost record 30 off of the shoulder 3. The stack of records is held between a supporting bracket 31 and the weighted finger 27 with a very narrow hold on the margin of the record. When the pusher has pushed the lowermost record 30 off of the shoulder 3 the said record 30 swings down by gravity and the hole encounters the inclined portion 28 of the spindle 1. This causes the record to be drawn to the left as viewed in FIG. 24 withdrawing the said lowermost record 30 from the grip of the parts 27, 31 and allowing the record to descend to the turntable 32.

The spindle of our invention may also be employed in conjunction with an overarm steadying mechanism as shown in FIG. 25 which comprises the spindle 1 having the roller or wheel 17 described in connection with FIGS. 1 to 23 inclusive, and it has also the pusher lever and resilient wheel gate described and illustrated in those figures. The overarm 33 has a depending cylindrical stud 34 mounted in a vertical cylindrical socket in the bracket 35. The arm 33 may be lifted and rotated, as is well understood in the art, to move it to one side of the stack so that records may be threaded on the holding portion 2 of the spindle. Also, the records may be removed from the rotatable platen 36 when the overarm is moved aside. The arm 33 has an opening which fits loosely over the holding portion 2 of the spindle 1 and it holds the stack in a horizontal or level position with the central holes aligned vertically.

Upon the operation of the pusher lever to push the lowermost record 37 off of the shoulder the said record drops to the platen 36 for playing in the usual manner. The operation of the swinging pusher and the rubber gate wheel 17 is as described in connection with the forms of the spindle arrangement of FIGS. 1 to 23 inclusive. FIGS. 24 and 25 merely illustrate diagrammatically suitable steadying means cooperating with the spindle of FIGS. 1 to 23.

The introduction of the within disclosed resilient roller into the spindle structure adds certain new capabilities to the record changer art without interfering with the normal mode of use by the operator.

It overcomes the difficulties introduced by non-uniform thickness of the records and non-standard configuration and size of the central holes.

A significant feature of the rubber roller is that it presents no difficulty to the removal of records from the turntable. When a record is removed from the spindle, the separator wheel 2 simply compresses and rolls through the record as the record passes over it. This rolling action minimizes the resisting force of the record during removal.

Upon initially threading one or more records upon the holding extension of the spindle, the resilient wheel tends to direct and hold the lowermost records onto the shelf or shoulder of the spindle.

A further function of the separator wheel is to retain the records on the spindle shelf or shoulder. Without the wheel they could easily slide off of the shelf when the spindle is disturbed. Due to the presence of the resilient roller the spindle may be subjected to rather severe side shock and not drop a record on the tone arm or turntable.

A good release of the lowermost record is insured by the downward force applied on the lowermost record when it is compressed into the resilient wheel and also by the rolling of the wheel caused by the lowering of the records.

I claim:

1. A record changer comprising a vertically disposed spindle body having a horizontal record supporting shoulder intermediate its ends, said body providing a record holding portion above the shoulder and a record guiding portion below the shoulder, a pusher comprising a lever pivoted intermediate its ends in a groove in the record guiding portion, said pusher being adapted to be extended above the shoulder a distance slightly less than the thickness of the thinnest record to be displaced, and a body of soft resilient rubber-like material rotatably mounted in the record holding portion of the spindle on a horizontal axis and having a round-shaped peripheral surface along the vertical axis, said round-shaped peripheral surface extending horizontally from the back of the record holding portion in a direction away from the shoulder a distance slightly greater than the width of the aforesaid shoulder, said body being disposed with the lower portion thereof lying within the central opening of a record supported on the shoulder and, being deformed, by the lowermost record moving laterally off of the shoulder whereby said body is caused to engage the surface of the opening in said next lowermost record in a direction to resist movement of said last named record toward the shoulder.

2. The combination of claim 1 wherein said body of soft resilient rubber-like material is a wheel pivoted on said horizontal axis and disposed in a slot in the record holding portion of the spindle body and being of a diameter of approximately the diameter of the record guiding portion of the spindle body and having its periphery lying in the path of return movement of the upper end of the pusher lever.

3. A record changer comprising a vertically disposed spindle body having a horizontal record supporting shoulder intermediate its ends, said body providing a record holding portion above the shoulder and a record guiding portion below the shoulder, a pusher comprising a lever pivoted intermediate its ends in a groove in the record guiding portion, said pusher extending above the shoulder a distance slightly less than the thinnest record to be employed in the changer and a body of soft resilient rubber-like material rotatably mounted on a horizontal axis in the record holding portion and having a round-shaped peripheral surface along the vertical axis, said round-shaped peripheral surface extending horizontally from the back of the record holding portion a distance substantially equal to the width of the aforesaid shoulder, said resilient body being disposed with a portion thereof lying within the central opening of a record supported on the shoulder, and being deformed, by the advance of the lowermost record in moving off of the shoulder to engage the inside surface of the hole of the next lowermost record in a direction to resist movement of said last named record in a direction off of the shoulder.

4. The combination of claim 3 wherein the grooved portion of the spindle and the pusher have interlocking projection and socket portions serving to support the pusher vertically upon initial drop of a record toward the shoulder, said record being dropped from the shoulder upon subsequent movement of the upper end of the pusher laterally in a direction away from the shoulder, the pivoting of the pusher on the spindle providing limited play in two dimensions in the plane of the groove to permit interengagement and disengagement of said projection and socket portions upon each operation of dropping a record from the shoulder.

5. A record changer comprising a spindle having a record holding portion and a guiding portion said guiding portion having a longitudinal slot, the record holding portion terminating at its lower end at a record supporting shoulder where it joins the guiding portion, a lever pivoted intermediate its ends in said slot and having its upper end extending above the shoulder by an amount slightly less than the thinnest record to be fed from the holding portion, the record holding portion of the spindle having a diametrical thickness in the plane of the lever less than that of the diameter of the central hold in the records to be dropped, and a body of soft resilient rubber-like material rotatably mounted in said guiding portion of the spindle on a horizontal axis and having a round-shaped peripheral surface along the vertical axis, said round-shaped peripheral surface projecting from the back of the guiding portion of the spindle and disposed to engage the wall of the hole in successive records as they descend towards the shoulder, to direct the lower records into register with the shoulder.

6. The record changer of claim 5 wherein the pivoting of the lever on the spindle comprises a pin and slot permitting relative longitudinal motion between the lever and the spindle, and spring means acting longitudinally of the lever urging the lever endwise toward its uppermost position, movement of the upper end of the lever away from the shoulder being accompanied by engagement of said body of rubber-like material by the upper end of the lever.

7. The record changer of claim 5 wherein the swingable lever is loosely pivoted in the guiding portion of the spindle by a pin and slot allowing a limited degree of freedom in two dimensions of motion of translation of the lever relative to the spindle, spring means urging the upper end of the lever to project above the shoulder after a discharge of a record from the shoulder, a detent on the lever and a shoulder on the spindle engageable by the detent, and means for yieldably holding the detent and shoulder in engagement, whereby the upper end of the lever is maintained in elevated position during the return motion of the lever away from the shoulder.

8. The combination of claim 5 wherein the pusher is pivoted on a pin and slot connection with the guiding portion of said spindle, spring means tending to raise the pusher to bring its upper end above the level of the shoulder and means for swinging the pusher in a direction to shove the lowermost record off of the shoulder.

9. A record changer comprising a vertically disposed spindle body having a horizontal record supporting shoulder intermediate its end, said body providing a record holding portion above the shoulder and a record guiding portion below the shoulder, a pusher comprising a lever pivoted intermediate its ends on the record guiding portion of the spindle said pusher extending above the shoulder a distance slightly less than the thinnest record to be employed in the changer and a wheel comprising a body of soft resilient rubber-like material journalled on a horizontal axis in a slot in the record holding portion of the spindle and having its periphery extending horizontally from the back of the record holding portion a distance substantially equal to the width of the aforesaid shoulder, said wheel being disposed with the lower portion thereof lying within the central opening of a record supported on the horizontal shoulder and being deformed by the advance of the lowermost record in moving off of the shoulder to engage the inside surface of the hole of the next to the lowermost record to cause said last-named record to be resistant to movement in the direction of the shoulder.

10. In combination a record changing spindle comprising a vertical record holding portion and a vertical guiding portion having a shoulder at the upper end of the guiding portion and having a vertical slot on the side opposite said shoulder, a pusher comprising a lever of the first class pivoted intermediate its ends on the guiding portion, the upper end of the pusher projecting above the shoulder to engage the wall of the hole in the lowermost record on the spindle to release the same from the shoulder and a wheel of soft resilient rubber-like material journaled on a horizontal axis in said vertical slot, the periphery of the wheel projecting laterally beyond the surface of the record holding portion a distance slightly greater than the width of the shoulder and tending to direct the downward motion of successive records on the holding portion in a direction to bring the edge of each record onto the shoulder as it is lowered toward the shoulder.

* * * * *